(12) United States Patent
Acharya et al.

(10) Patent No.: US 8,116,209 B2
(45) Date of Patent: Feb. 14, 2012

(54) METHODS AND APPARATUS FOR IDENTIFYING ERRORS AND STRANDED RESOURCES IN NETWORKS

(75) Inventors: Swarup Acharya, New Providence, NJ (US); Edward J. Lafontaine, Haverhill, MA (US); Wee Teck Ng, Berkeley Heights, NJ (US); Pankaj Risbood, Roselle, NJ (US)

(73) Assignee: Alcatel Lucent, Paris (FR)

( * ) Notice: Subject to any disclaimer, the term of this patent is extended or adjusted under 35 U.S.C. 154(b) by 1867 days.

(21) Appl. No.: 11/126,415

(22) Filed: May 11, 2005

(65) Prior Publication Data

US 2006/0256727 A1 Nov. 16, 2006

(51) Int. Cl.
*H04L 12/26* (2006.01)
(52) U.S. Cl. ...................................................... 370/242
(58) Field of Classification Search .................. None
See application file for complete search history.

(56) References Cited

U.S. PATENT DOCUMENTS

| | | | | |
|---|---|---|---|---|
| 6,003,097 | A * | 12/1999 | Richman et al. | 710/8 |
| 6,012,052 | A * | 1/2000 | Altschuler et al. | 707/999.102 |
| 6,732,263 | B1 * | 5/2004 | May et al. | 713/1 |
| 7,440,408 | B1 * | 10/2008 | Anderson | 370/252 |
| 2005/0063410 | A1 * | 3/2005 | Konda | 370/432 |
| 2006/0133430 | A1 * | 6/2006 | Nagesh et al. | 370/536 |

OTHER PUBLICATIONS

Y. Breitbart et al., "Topology Discovery in Heterogeneous IP Networks: The NetInventory System," Proceedings of IEEE/ACM Transactions on Networking, vol. 12, No. 3, pp. 401-414, Jun. 2004.
"Operations Application Messages—Language for Operations Application Messages," Bellcore Standard GR-831-CORE, Issue 1, OTGR Section 12.1, 100 pages, Nov. 1996.
Craft Interface Terminal (CIT), "FT-2000 OC-48 Lightwave System Releases 8.1 through 9.1," Chapter 11, vol. 1, Issue 4.0, User/Service Manual, Lucent Technologies, pp. 11-i to 11-124, Aug. 2002.
S. Acharya et al., "Hitless Network Engineering of SONET Rings," GLOBECOM, IEEE Global Telecommunications Conference, vol. 22, No. 1, 5 pages, Dec. 2003.
S.Acharya et al., "MobiPack: Optimal Hitless SONET Defragmentation in Near-Optimal Cost," IEEE Infocom, The Conference on Computer Communications, vol. 23, No. 1, 11 pages, Mar. 2004.

(Continued)

*Primary Examiner* — Raj Jain
(74) *Attorney, Agent, or Firm* — Ryan, Mason & Lewis, LLP (57) ABSTRACT

Techniques are disclosed for identifying one or more errors and/or one or more stranded resources in a connection-oriented or circuit-switched network. By way of example, a technique for identifying at least one of an error and a stranded resource in at least a portion of a connection-oriented or circuit-switched network comprises the following steps/operations. Field data is obtained directly from one or more elements of the network. At least a portion of the obtained field data is examined to determine an existence of at least one of an error and a stranded resource with respect to one or more element-level constructs. Data synthesized from at least a portion of the obtained field data is analyzed to determine an existence of at least one of an error and a stranded resource with respect to one or more network-level constructs.

20 Claims, 6 Drawing Sheets

OTHER PUBLICATIONS

P. Bohannon et al., "The NetML Network Model," Lucent Technologies Technical Document ITD-04-45374V, pp. 1-19, May 2004.

RHK, Inc., Special Report, "Discovery and Reconciliation Portend Dramatic Improvements in Telecom Operational Efficiency," pp. 1-11, Jun. 2003.

CoManage Corporation, "Network-Driven™ Data Integrity, Foundation for Operation Excellence, An Overview of TrueSource," White Paper, CoManage Corporation, pp. 1-12, 2003.

* cited by examiner

| FIELD DATA IN TL1 FORMAT |
|---|
| DTRV-CRS-STS1:NYWS2NEPTUNE::3;<br>NYWS2NEPTUNE 70-01-14 21:11:23_cr_escp_M 3 COMPLD_cr_escp_<br>"1s-5a-1, sts1-1w-1-1:2WAY:LOCZ=EX,AUDIT=yes,REDLINE=no" |

| NetML MODEL |
|---|
| <networkElement id="NEPTUNE" location="NYWS2"><br>  <port id="1w" layer="OC48" adapterClass="OC3-OC48"><br>    <port layer="OC3" id="1" adapterClass="STS1-OC3"><br>      <port layer="STS1" id="1"/><br>      ...<br>    <port layer="DS3" id="5a#1/><br>    ...<br><connect><br>    <ref><port id="1w"/><port id="1"/><port id="1"/></ref><br>    <ref><port id="5a#1"/></ref><br></connect> |

```
Input: A list of cross-connections X_i of a network element, i=1..n
Output: A list of invalid cross-connection
for i=1 to n do List[i] = []                // initialize empty list
for i=1 to n do List[EP(X_i)].append (X_i)  // create cross-connection list
for port in List do
   X_0 = List.pop()
   if List.length() == 1                    // A single 1-way crossconnection
      if type (X) ==oneway
         Print "oneway crossconnection ", X.print()
   else
      for i=2 to List.length() do
         X = List.pop()
         if type(X) != type(X_0)            // inconsistent crossconnection
            Print "inconsistent crossconnections ", X.print()
```

METHODS AND APPARATUS FOR IDENTIFYING ERRORS AND STRANDED RESOURCES IN NETWORKS

FIELD OF THE INVENTION

The present invention relates generally to the field of data communication networks and, more particularly, to techniques for identifying errors and stranded resources in connection-oriented or circuit-switched networks.

BACKGROUND OF THE INVENTION

Synchronous Optical Network (SONET) and Synchronous Digital Hierarchy (SDH) networks are widely deployed in enterprise and telecommunication networks as access and backbone networks. But the inventory systems for SONET/SDH networks are typically known to be only 60 to 80 percent accurate. This means that the inventory of equipment and services in network management databases is off from the actual network state. This results in many erroneous configurations that consume network resources without serving customers or generating revenue.

Figure 1:
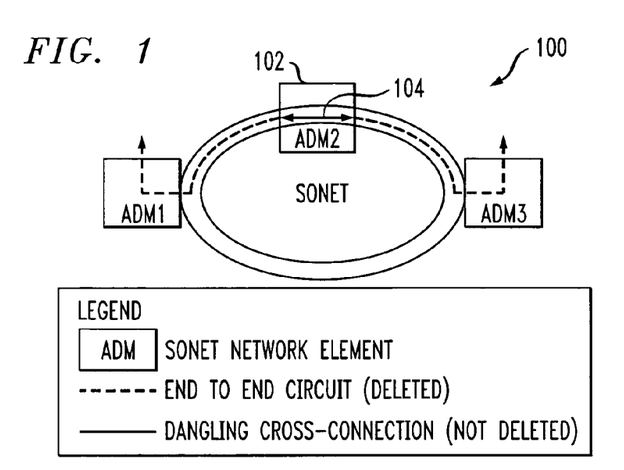
FIG. 1 is a diagram illustrating a dangling cross-connect resulting in a stranded resource.

FIG. 1 shows an example of a circuit fragment (e.g., a cross-connect) that was not deleted when the service was deactivated. The cross-connect 104 is associated with an add-drop multiplexer (ADM) element 102 in the SONET ring 100 shown. Since this circuit fragment does not exist in the inventory management system of the carrier, the inventory system will try to use this resource to set up new services, but all such attempts will fail. Stranded resources can also result when undocumented network elements and cards are not reflected in the inventory system. The network operator may not be aware of the availability of these resources to support new services. This results in the unnecessary deployment of additional capital and equipment. It has been estimated that the typical service provider has 20 to 30 percent stranded assets at any given time, and achieving merely five percent asset recovery would equal $15 billion in revenue savings in North America alone.

Stranded resources can also lead to longer service provisioning times because a network operator cannot determine the status and capacity of network resources in a timely fashion. In the example shown in FIG. 1, a network operator may provision a circuit using the tributary port consumed by the dangling cross-connection in the SONET network element (NE) named ADM2 as this resource is deemed "available" according to the inventory system. The operator will need to conduct time-consuming resource verification on the network element and reconcile the differences with the inventory system before the new service can be designed, provisioned and activated. It has been estimated that it takes two to three weeks to activate a service spanning multiple SONET rings in North America, and most of the time is spent on manual tasks, e.g., verifying resource availability by querying individual SONET/SDH equipment.

Current approaches tend to focus on stranded resource recovery and inventory accuracy. However, carrier networks also have a significant amount of incorrectly configured equipment that affects network reliability and performance. These configuration errors cause latent errors and are hard to detect because they are dormant until another error triggers them. For example, although an incorrectly configured 1+1 cross-connection successfully activates the service, it will fail to switch to the backup path on failure. This may result in reliability less than that promised in the service level agreement and can potentially impact revenue of the carrier.

Stranded resources and configuration errors can be caused by operator errors, prevalence of dumb devices with no management interfaces (e.g., patch panels), software bugs, and management process deficiencies, and cannot be easily prevented. The traditional solution to identifying errors is to improve the accuracy of the inventory database using an inventory reconciliation system, and then to subsequently check the updated inventory database for errors.

Figure 2:
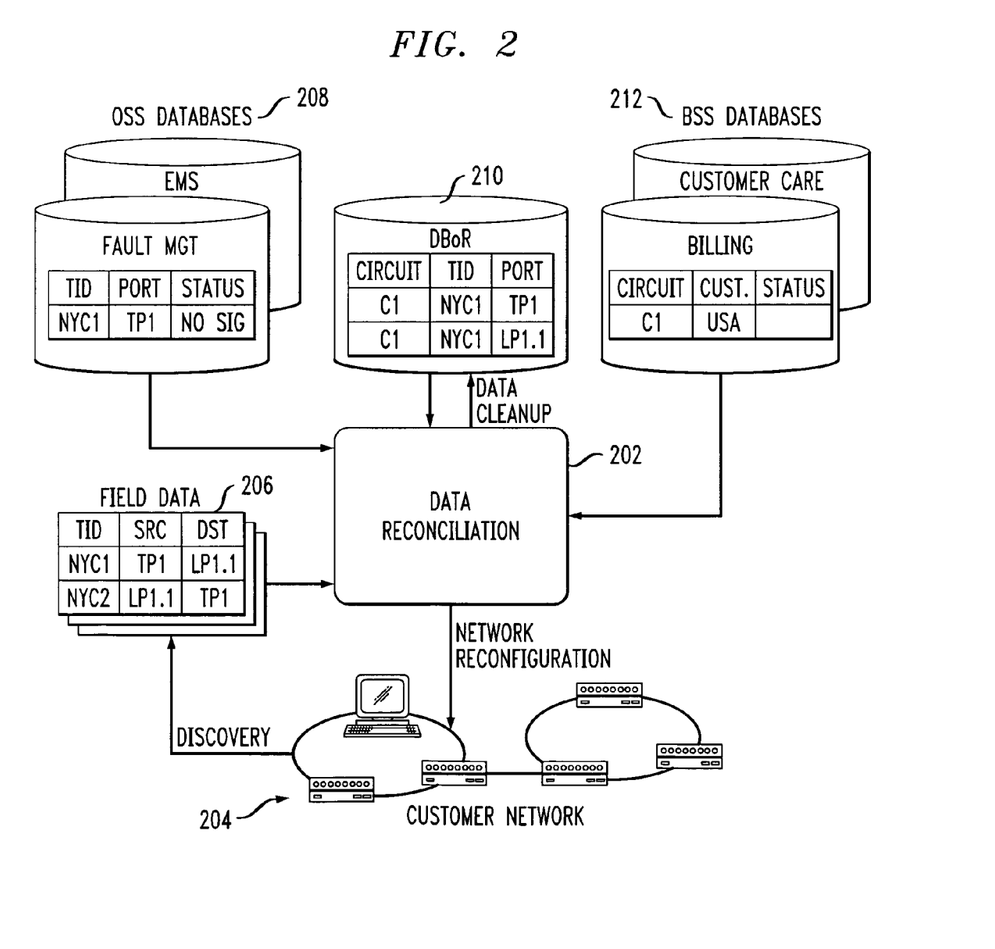
FIG. 2 is a diagram illustrating a technique for identifying stranded resources via inventory reconciliation.

FIG. 2 shows a typical inventory reconciliation process 202. One first gathers up-to-date data from the SONET/SDH equipment 204 (i.e., field data) and normalizes it to some format (e.g., relational database). The field data 206 is then compared with normalized data extracted from various databases in the data reconciliation phase. This is a complex and expensive process as it works on multiple databases with different access methods and schema. A typical telecom carrier has many management systems, including a database of record (DBoR) 210 which stores the inventory data, Business Support Systems (BSS) 212 such as billing and customer care, and Operation Support Systems (OSS) 208 that manages the SONET/SDH equipment such as Element Management System (EMS) and fault management systems.

The traditional approach of using an inventory reconciliation system may require other databases, several instances of middleware to facilitate access to various management systems, a workflow management system to track work orders, and reporting software, resulting in significant investment in software and personnel. This is a long drawn out and often a very complex undertaking.

Conventional data reconciliation tools from vendors such as CoManage (Fairfax, Va.), MetaSolv (Plano, Tex.) and Granite (Telcordia of Piscataway, N.J.) typically follow the model in FIG. 2. Their main goal is to get the DBoR up-to-date and perform stranded resource recovery from the DBoR. Some tools also perform operations to reduce the amount of data that needs to be reconciled, see, e.g., CoManage TrueSource. Conventional reconciliation tools can improve the inventory system accuracy to 80 to 95 percent, but cannot eliminate all errors. This can be because the service provider network typically has many dumb devices like patch panels that are managed manually and are thus prone to human errors.

Many telecom carriers are experiencing budget constraints and are not willing to invest heavily in an inventory reconciliation system, especially on legacy SONET networks that may be replaced in a few years. These customers are looking for a low-cost approach to quickly identify stranded assets and configuration errors.

Traditional approaches to data cleanup (e.g., parsing, field standardization, matching, and consolidation) are useful for simple errors like syntax errors. However, for network recovery, there is a need to go beyond data cleanup to identify invalid configurations (which may be syntactically correct).

SUMMARY OF THE INVENTION

The present invention provides techniques for identifying one or more errors and/or one or more stranded resources in a connection-oriented or circuit-switched network.

By way of example, in one aspect of the invention, a technique for identifying at least one of an error and a stranded resource in at least a portion of a connection-oriented or circuit-switched network comprises the following steps/operations. Field data is obtained directly from one or more elements of the network. At least a portion of the obtained field data is examined to determine an existence of at least one of an error and a stranded resource with respect to one or more element-level constructs. Data synthesized from at least a portion of the obtained field data is analyzed to determine an existence of at least one of an error and a stranded resource with respect to one or more network-level constructs.

The technique may further comprise taking at least one action to correct one or more existing errors and stranded resources, e.g., reconfiguring at least a portion of the network. The field data obtaining step/operation may further comprise automatically or manually collecting field data directly from one or more elements of the network. The technique may further comprise modeling the network based on at least a portion of the obtained field data.

By way of example, an element-level construct may comprise one of port, a timeslot and a cross-connection, while a network-level construct may comprise one of circuit, a ring and a network element.

The element-level construct examining step/operation may further comprise checking for one or more of a syntax error, a schema error, a semantic error, a configuration error, a status indicative of a stranded resource.

The network-level construct analysis step/operation may further comprise performing at least one of a circuit analysis and an inventory analysis. The circuit analysis may further comprise verifying that a circuit in the network is correctly configured. The circuit analysis may further comprise a semantic-based circuit analysis for determining an existence of one or more of a dangling circuit, a squelch circuit, a trunk circuit and a fragmentation. The circuit analysis may further comprise a status-based circuit analysis for determining a port status of end-points of a circuit. The inventory analysis may further comprise examining information relating to at least one of sparing and software configuration.

The connection-oriented or circuit-switched network may comprise a Synchronous Optical Network (SONET) or a Synchronous Digital Hierarchy (SDH) network.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

It is to be appreciated that while principles of the invention will be described below in the context of a SONET/SDH environment, the invention is not so limited. That is, the present invention is more generally applicable to any connection-oriented or circuit-switched network in which it would be desirable to provide techniques for identifying stranded resources and configuration errors.

As compared to the conventional reconciliation process generally described above in the context of FIG. 2, principles of the invention eliminate the data reconciliation step and operate directly on field data. The approach provided by principles of the invention is faster and more effective for the investment made as it operates on critical portions of the network where problems are already identified. Moreover, heuristics that can account for specific, localized engineering rules can be employed. Further, data synthesis may be performed to synthesize higher-level models (e.g., circuits) based on base constructs (e.g., cross connects). Still further, unlike traditional data cleanup, principles of the invention may assume a single data source and not focus on data quality problems from multiple data sources.

As will be illustratively explained below, principles of the invention propose a simpler and more direct approach to find a large class of stranded resources and configuration errors from field data alone. These errors may include, but are not limited to, unused resources, excessive sparing, incorrect (but legal) configurations and inefficient configurations. The approach is not meant to be as exhaustive as the standard reconciliation approach. Instead, for a provider not inclined to invest heavily, it aims to provide a low-cost approach to remove some of the most common and glaring inefficiencies in the system.

Like a conventional inventory reconciliation system, we also need to gather field data directly from SONET/SDH equipment. We model the network in extensible markup language (XML) and perform various types of data analysis and synthesis to identify stranded resources and configuration errors. One way that may be employed to model the network is described in P. Bohannon et al., "The NetML Network Model," Lucent Technologies Technical Document ITD-04-45374V, 26 May 2004, the disclosure of which is incorporated by reference herein.

As will be illustratively explained, principles of the invention employ heuristics developed to detect stranded resources and configuration errors. In particular, we use our understanding of the network to develop a set of semantics-based validators to detect incorrect configurations and stranded resources. We also develop a status-based approach to detect stranded resources by comparing the synthesized data with equipment status and alarm data. Our approach is significantly faster than conventional data reconciliation tools and can be run frequently to keep the network "clean." In many cases, our approach is the only feasible option when only the field data is available. Moreover, our approach can complement existing data reconciliation tools as it can be used as a front-end tool to greatly reduce the volume of corrupt data into the reconciliation tool.

Our approach can identify a significant amount of stranded resources and configuration problems. For example, we found that 10 percent of the circuits in a large customer network are stranded circuits, and 33 percent of 1+1 protection circuits have incorrect configurations.

Finally, our approach also differs fundamentally in its applicability. Traditional data reconciliation efforts start top-down at the Network Operations Center (NOC) to correct the various provisioning and billing databases under its purview and then, going down to extract data from the NEs. In other words, they are aimed at the NOC operations staff who typically have a higher-level view of the "global" network. On the other hand, we present a more bottom-up, operator-centric approach aimed at the field personnel to provide an operator with the necessary tools to correct any errors in portions of the network they are responsible for. Consequently, our approach is not designed to be exhaustive; instead it aims to find localized errors that are common and often, well known and fix them without a significant overhead.

Accordingly, as will be illustratively explained below, the invention provides techniques that address problems associated with stranded capacity in service provider networks and the potential monetary and efficiency benefits in recovering this capacity. It is to be understood that while some illustrative provisioning and equipment problems that one might encounter in a typical service provider SONET/SDH transport network are mentioned, the invention is not limited to addressing these specific problems.

Advantageously, principles of the invention provide an effective, low-cost approach based on the network field data with a goal to correct any specific, localized network problems where they are known to exist. Our approach encompasses both syntactic and semantic analysis based on creating high-level circuit and network models from the underlying data.

For the sake of ease of reference, the remainder of the detailed description will be divided in the following sections. Section 1 provides an overview of our approach. In Section 2, we describe our data discovery process and data model. In Section 3, we list the various illustrative stranded resources and configuration errors we address and describe how we identify them. In Section 4, we show how to synthesize higher-level models from base constructs and use them to identify more stranded resources. In Section 5, we present results from two studies on operational SONET network. Section 6 describes an illustrative computing system for implementing a stranded resource and configuration error identification system.

1. Process Overview

Figure 3:
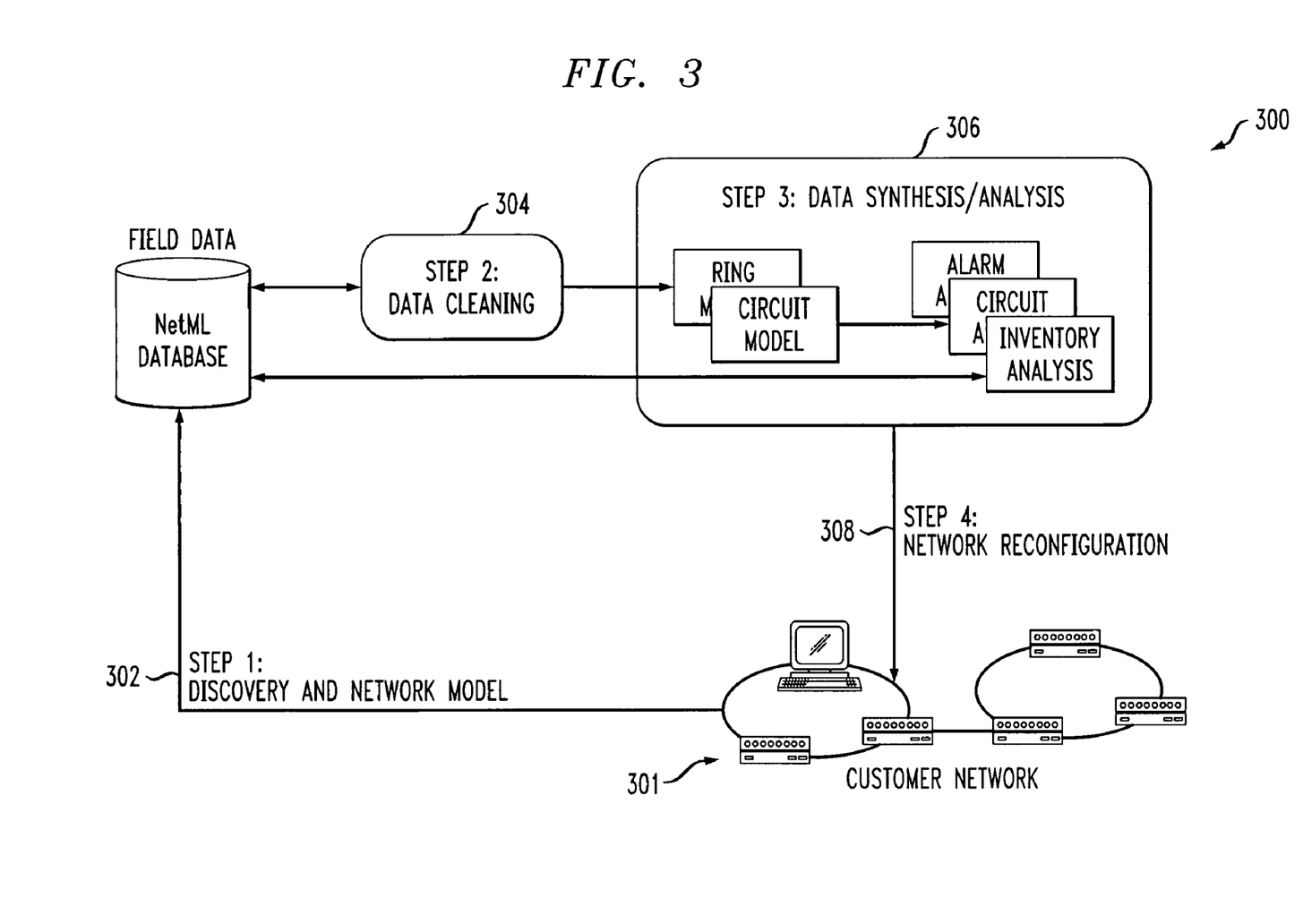
FIG. 3 is a diagram illustrating a technique for identifying stranded resources according to an embodiment of the invention.

Referring now to FIG. 3, a diagram illustrates a technique for identifying stranded resources according to an embodiment of the invention.

As shown, in a first step (302), process 300 collects detailed network information (i.e., field data) directly from the SONET/SDH network elements (NEs) 301 and models the network using a XML language. Illustrative details of this first step are described below in Section 2.

In a second step (304), process 300 examines the field data to identify syntax and semantic errors on base constructs (i.e., data cleaning). The base constructs are the ports, timeslots and cross-connections that make up a SONET/SDH network. Illustrative details of this second step are described below in Section 3.

Process 300 then synthesizes higher-level models (i.e., circuits, rings and NEs) from the data and analyzes this synthesized data to identify stranded resources and configuration errors, in a third step (306). Illustrative details of this third step are described below in Section 4.

The network is reconfigured to remove these errors, in a fourth step (308). Once the stranded resources and configuration errors are identified, reconfiguration of the network to address the results can be accomplished in any known manner.

In accordance with this illustrative explanation, we use an Bi-directional Line-Switched Ring (BLSR) OC-48 SONET (as described in W. Goralski, "SONET," McGraw-Hill Osborne Media, Emeryville, Calif., USA, 17 May 2000, the disclosure of which is incorporated by reference herein) rings as examples, but our approach is applicable to SONET and SDH networks of different multiplexing hierarchies and configurations (e.g., ring, mesh), as well as other connection-oriented or circuit-switched networks. We focus on the cross-connection base construct and the circuit model to illustrate our algorithms. Other base constructs and higher-level models that can be addressed have similar or lower complexity.

2. Data Collection and Network Modeling

Field data can be collected manually by an operator or automatically using a network discovery system. One example of a network discovery system that can be used is described in Y. Breitbart et al., "Topology Discovery in Heterogeneous IP Networks," Proc. 19$^{th}$ IEEE Infocom, 26 Mar. 2000, the disclosure of which is incorporated by reference herein. Another discovery system that may be used is the CoManage TrueSource system. However, the invention is not limited to how the field data is collected and, when automatically collected, to any particular discovery system.

For illustrative purposes, we describe a manual collection approach here. This approach includes retrieving the network topology, circuit pack inventory, equipment configuration and operational status via the SONET management interface of each network element (NE) from which data is being collected. The field data can be in various formats such as Transactional Language 1 (TL1) (e.g., "Operations Application Messages-Language for Operations Application Messages," Bellcore standard GR-831, the disclosure of which is incorporated by reference herein) or Craft Interface Terminal (CIT) (FT-2000 OC-48 Lightwave System Releases 8.1, User/Service Manual, Lucent Technologies, the disclosure of which is incorporated by reference herein). However, the invention is not limited to any particular format. In accordance with the identification process of the invention, we convert the native format to a normalized format and store it in a database for further analysis.

We model the network using NetML (P. Bohannon et al., "The NetML Network Model," Lucent Technologies Technical Document ITD-04-45374V, 26 May 2004, the disclosure of which is incorporated by reference herein). NetML is an XML-based language for modeling computer and telecommunication networks. Unlike most network management systems that model different levels or aspects of the network and store the data in different databases (relational, XML, IMS, etc), we use NetML as a common central database to model all aspects of the network. NetML also has a rich set of analysis and visualization tools to expedite network analysis and research, and we can also leverage many powerful public domain packages such as XSLT and XQuery languages.

Figure 4:
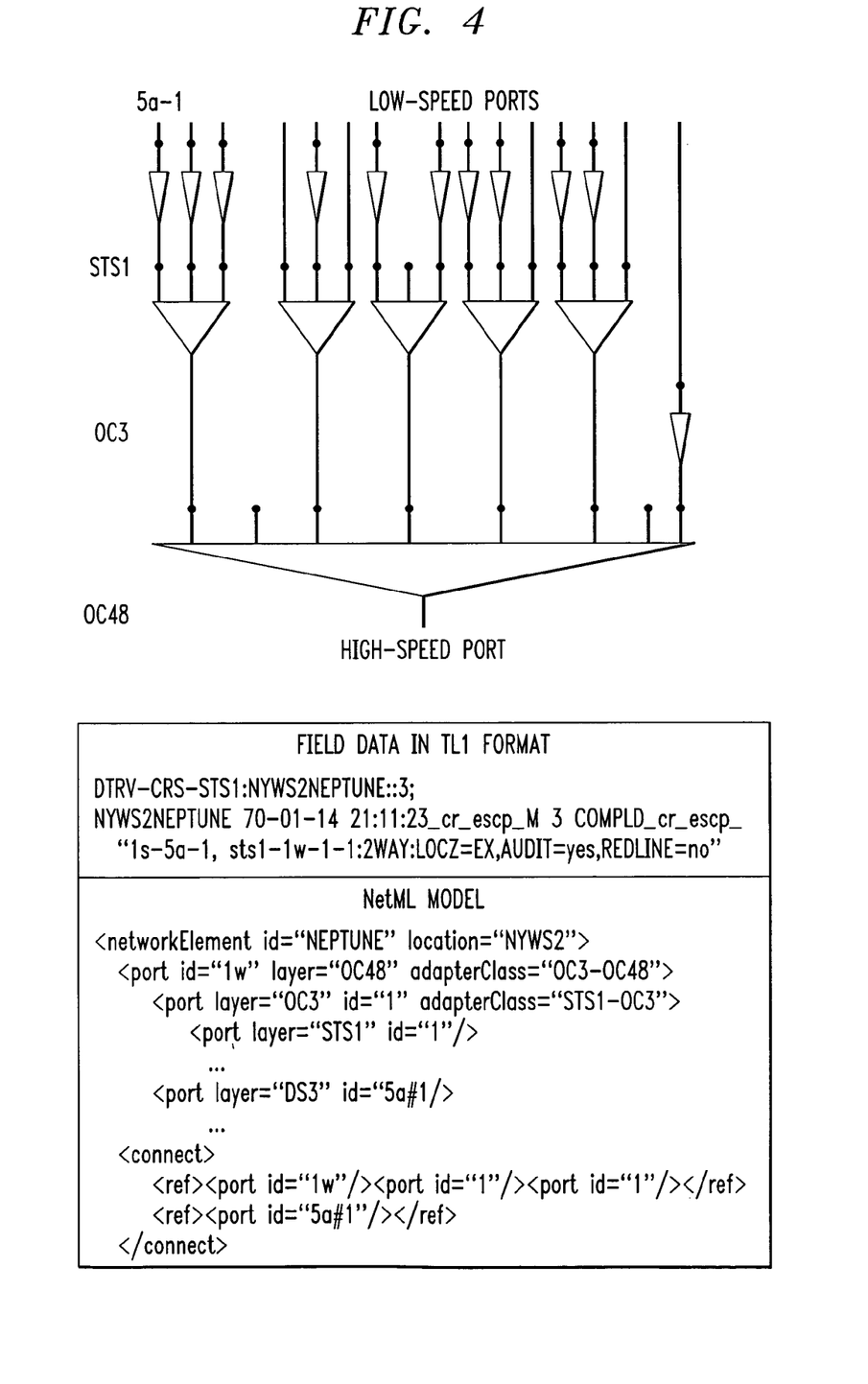
FIG. 4 is a diagram is a diagram illustrating raw data and a NetML representation of a network element according to an embodiment of the invention.

FIG. 4 shows an example of the raw data format and NetML model of an OC48 NE. We first briefly describe the functionality of a SONET/SDH NE and some industry terminology we use. The role of a SONET/SDH NE is to be a data multiplexer, collating numerous low bandwidth (or, "low-speed") streams (e.g., STS-1/52 Mbps) of customer traffic into a single high bandwidth, or "high-speed" streams (e.g., OC-48/2.5 Gbps) that are carried long distances. Consequently, an NE includes numerous "client-side" ports or, low-speed ports and one (or, at most, very few) "line-side," or high-speed ports. The multiplexing hierarchy is different for SONET and SDH, the former has STS/OC-1, 3, 12, 48 bandwidth rates while the latter follows the STM-1, 4, 16 hierarchy. FIG. 4 illustrates the SONET case. Each NE typically is part of the "ring" with a minimum of two pairs of fibers, one carrying traffic in the clockwise direction and the other in the counter-clockwise direction. The neighboring nodes are often referred to as being in the east and west direction.

The data files in FIG. 4 show a STS1 cross-connection between a low-speed port (5a-1) and a STS1 tributary (1w-1-1) on the OC48 high-speed link. The raw data is in TL1 format. The pictorial representation is generated using NetML's nplot and BLLinkBrowser tools from the NetML database.

3. Data Cleaning

Once a complete model of the network is generated, the network model is examined to "clean" erroneous data. Data cleaning is traditionally used to remove "dirty" data resulting from incorrect abbreviations (e.g., "Stby" instead of "Stdby"), data entry mistakes (e.g., NY instead of NYC), duplication, missing fields, etc. In accordance with principles of the invention, we go beyond standard syntax and schema checks to detect semantic errors.

Data cleaning is done in a pipeline approach. The process begins by checking for syntax errors and model/schema constraint violations in the base-constructs. Next, the process looks at the semantics of the data and check for configuration errors. The process then uses status information to look for more configuration errors and unused resources.

3.1 Syntax Check

A syntax check is performed on the raw data before converting it to NetML. These checks are data-format specific and are part of the data parsing process. For example it is verified that a DS3 low-speed port has the proper syntax (i.e., ls-[1-8][a|b]-[1-3], as per FT-2000 OC-48 Lightwave System Releases 8.1, User/Service Manual, Lucent Technologies).

3.2 Data Model Checks

After the raw data is converted to NetML, the NetML model is checked for schema and semantic errors. The latter validates the semantic properties of a NetML file that cannot be easily checked by XML schema validation. The basic algorithm to clean cross-connection is as follow:

Definition 1. A cross-connection X is defined as a tuple (EP(X), WP(X), EA(X), WA(X), ES(X), WS(X), type, timeslot). Here, E and W refer to East and West and P, A and X refer to Port, Address and Status respectively.

1. EP and WP represent one of two things. They are either low speed ports (e.g., 5a-1 in FIG. 4), or, tributaries on the high-speed port (e.g., 1w-1-1 in FIG. 4) and are ordered east to west. For example, (5a-1, 1w-1-1) in FIG. 4.

2. EA and WA are equipment names (e.g., NYW2NEPTUNE in FIG. 4) and are ordered east to west.

3. ES and WS are port status and are ordered east to west.

4. type is the cross-connection type (e.g., one way, two way, active, standby).

5. timeslot is the timeslot on the high-speed port (e.g., 1-1 in FIG. 4).

NetML verifies that EP and WP exist and are at the same multiplexing hierarchy, and EP(X)≠WP(X), EA(X)≠WA(X) (i.e., no loopback). For example, NetML flags an error when it finds a STS1 cross-connection between a DS3 port and a STS3 link.

3.3 Semantics-Based Cleaning

An understanding of the semantics of the data can be used to verify that the basic constructs are valid. For cross-connections, the type, address and configuration rules are checked. Type field validators are used to detect latent errors that are caused by legal but inconsistent cross-connection configurations, such as the 1+1 protected cross-connection validator shown in FIG. 5.

Figure 5:
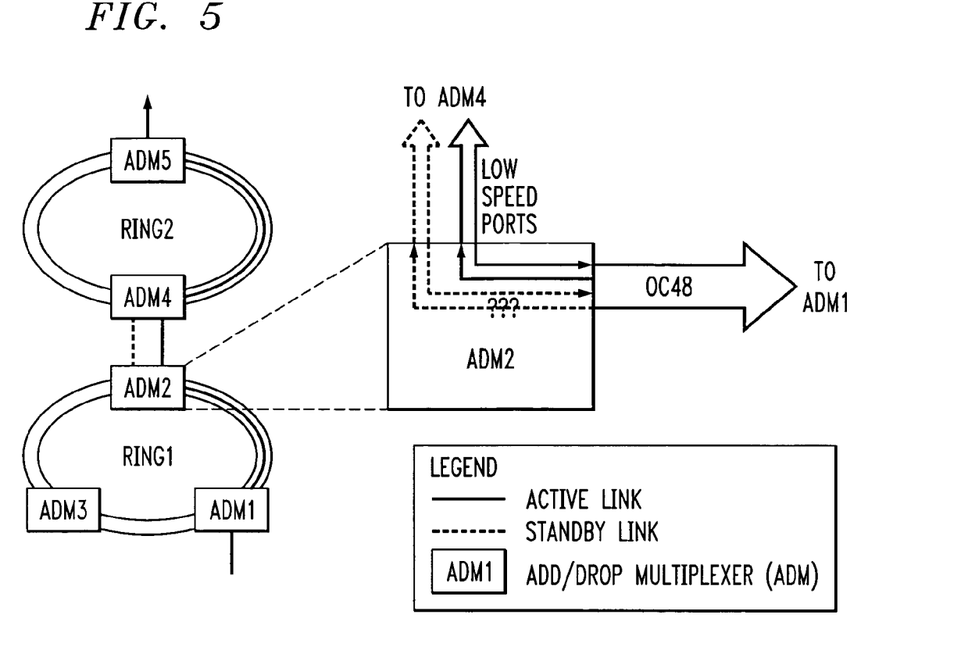
FIG. 5 is a diagram illustrating an invalid 1+1 cross-connection according to an embodiment of the invention.

FIG. 5 shows a circuit originating at the SONET Add/Drop Multiplexer (ADM) named ADM1 in Ring1 and terminating at ADM5 in Ring2. ADM2 has a missing cross-connection marked "???" thus causing the standby link to have only 1-way communications when the active link fails. This circuit requires four 1-way cross-connections in ADM2 and ADM4 to support an active and a standby two-way links. The circuit will operate even if the standby link is not provisioned or partially provisioned as shown in FIG. 5, but will fail when the active link between ADM2 and ADM4 fails. This type of latent error has severe reliability implications on the customer as it downgrades the circuit's reliability from 99.9999 percent to 99.9 percent. Assuming links fail independently, a single link will fail with probability p, and a 1+1 link will fail with probability $p^2$. Availability is defined as $(1-p)*100$ percent, so if p=0.001 (i.e., one link failure a year with mean repair time of eight hours), the availability of a single and 1+1 links are 99.9 percent and 99.9999 percent, respectively. Since these errors do not manifest themselves at the time of provisioning a service, they are quite common in operational networks. We found that 33 percent of the 1+1 cross-connections in a large customer network have this type of error.

Figure 6:
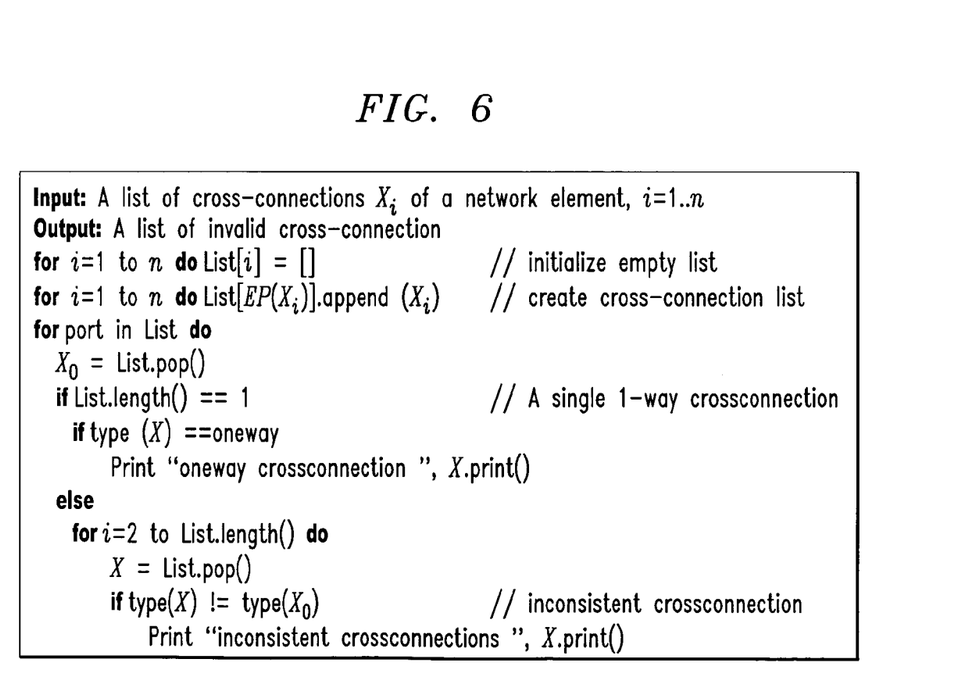
FIG. 6 is a diagram illustrating an algorithm to detect invalid cross-connection types originating from low-speed ports according to an embodiment of the invention.

An illustrative algorithm to detect inconsistent cross-connection types is shown in FIG. 6. The cross-connections are grouped into lists indexed by the low-speed ports, and the list is inspected for inconsistent cross-connection types (e.g., a 1+1 cross-connection has a mixture of 1-way and 2-way cross connections). XQuery 1.0 language may be employed to implement the validators for convenience and maintainability.

The semantics-based validators can be general or equipment specific. Equipment specific validators typically reflect engineering rules that are enforced by the equipment. For example, the Lucent FT-2000 ADM forbids the use of low-speed ports from non-adjacent circuit packs in a 1+1 protected cross-connection. The equipment typically enforces these rules and we rarely see such invalid configuration on field data.

3.4 Status-Based Cleaning

An extension of the semantics-based cleaning is to use status information to identify stranded resources and configuration errors. The status of each base construct can be examined to verify that it is carrying live traffic. For example, a cross-connection can be flagged as unused if it does not carry any user traffic. Conversely, a low-speed port that is carrying user traffic but has no cross-connection configured is missing a cross-connection. Sometimes the status information may be vague (e.g., a port may be configured but not set to monitor errors) and more information will be needed to deduce if resource is in use. In Section 4.1.2 below, we will provide more detail on status-based cleaning and circuit analysis.

The next section describes how a high-level model is synthesized from base constructs to filter the error data and to deduce more conclusively if a base construct is in use or incorrectly configured.

4. Data Synthesis/Analysis

The data cleaning performed in Section 3 is local to NE. In this section, we describe a process for synthesizing higher-level constructs from base-constructs to do data cleaning and analysis on a ring-wide basis. This allows to uncover more stranded resources and configuration errors than that found in Section 3. The higher-level constructs are circuits, rings and NE models. These constructs are used to perform circuit and inventory analysis.

4.1 Circuit Analysis

We illustratively define a circuit as an end-to-end path between two low-speed ports in a single SONET ring:

Definition 2. A circuit C is defined as a list of cross-connections $(X_1, X_2, \ldots X_n)$ such that timeslot$(X_i)$=timeslot$(X_j)$, i,j=1 . . . n and $X_i \in$ Ring.

Figure 7:
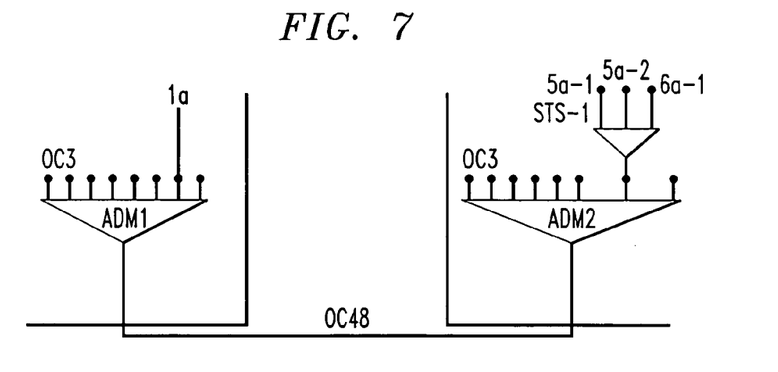
FIG. 7 is a diagram illustrating a circuit definition example according to an embodiment of the invention.

FIG. 7 shows three STS1 circuits between ADM1 and ADM2. Both ADMs are part of an OC48 BLSR ring. There are 3×STS1 circuits between low-speed ports 1a-1, 1a-2, 1a-3 of ADM1 and ports 5a-1, 5a-2 and 6a-1 of ADM2 on timeslots 7-1, 7-2 and 7-3, respectively. Further, in this example, the OC48 link between ADM1 and ADM2 is de-multiplexed into eight lower speed OC3 links. An OC3 link on timeslot 7 of the OC48 link is further de-multiplexed into 3×STS1 circuits between low-speed ports 1a-1, 1a-2, 1a-3 of ADM1, and low-speed ports 5a-1, 5a-2, and 6a-1 of ADM2, respectively. Since a typical customer circuit spans multiple rings and may encounter a dumb device like a patch-panel when it jumps from one ring to other, for our analysis, we illustratively define circuit as a fragment of end-to-end customer circuit contained in a single ring.

Once the circuits are extracted from field data, semantics and status-based cleaning can be performed.

4.1.1 Semantics-Based Circuit Analysis

Figure 8:
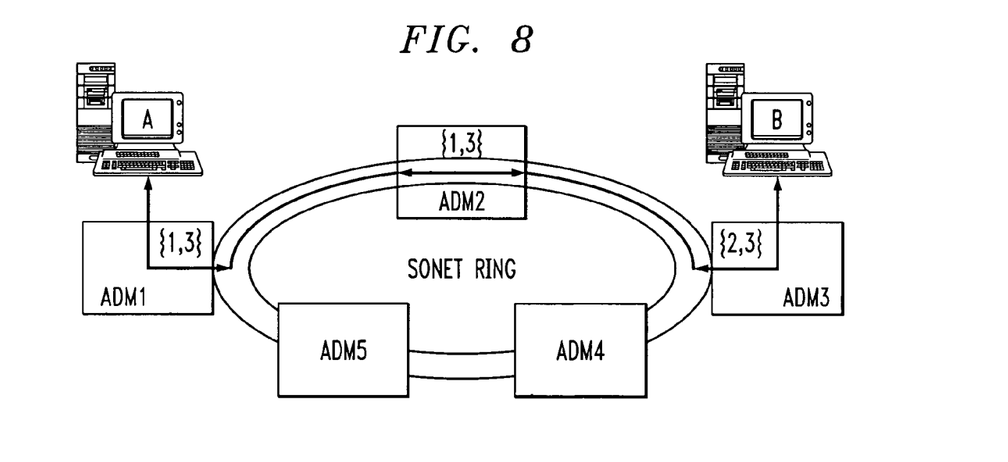
FIG. 8 is a diagram illustrating a squelch circuit example according to an embodiment of the invention.

In semantics-based cleaning, verification is done to determine that a circuit is correctly configured. A number of different errors can be caught during this process for the circuits in the data. By way of example only, we present four classes of errors. The invention is not limited to any particular class of error.

a) Dangling Circuits: An example of a dangling circuit was presented in Section 1 (see FIG. 1). Essentially, a circuit is dangling if either end of the circuit does not terminate on a low-speed port, i.e., one of $EP(X_1)$ and $EP(X_n)$ is not a low-speed port, where $X_1$ and $X_n$ are the end cross connects.

b) Squelch circuit: A squelch circuit has incorrect addresses on one or more cross-connections along its path. It is an example of a latent error as the addresses are only used during SONET ring recovery, but has severe implications on the customer's service level agreement (SLA) during ring/node failures. FIG. 8 shows an example of a squelch circuit originating from ADM1 and terminating in ADM3. This example shows a circuit with incorrectly configured addresses in ADM3. The source and destination addresses are shown in curly brackets. For example, it should be {1,3} for a circuit that originates in ADM1 and terminates in ADM3. This circuit will fail when ADM2 fails, even though the circuit can be re-routed via ADM4 and ADM5. This is because ADM3 assumes that the source of the circuit is ADM2 and thus will not recover when ADM2 fails.

c) Trunk Circuits: A correct circuit may be configured in a non-optimal way by consuming unnecessary resources or using non-optimal timeslot layout on intermediate hops. The former is very common on networks with heterogeneous equipment and is detected by the trunk circuit validator. For example, a STS1 circuit may traverse multiple ADMs with different switching granularities, and will consume a larger STS3 bandwidth on ADMs that cannot switch at STS1 granularity. These circuits could potentially be re-routed to ADMs with matching switching granularity.

d) Link and Ring Defragmentation: A SONET ring can also have non-optimal timeslot layout when circuits are added and deleted over time. This causes the available bandwidth on the ring to become fragmented leaving behind "stranded" capacity which may be difficult to use while provisioning circuits. Fragmentation occurs at all levels of the network, i.e., in links, rings and the mesh network. The fragmentation validator will detect link fragmentation. For example, a SONET ring may have sufficient capacity to support an OC12 circuit (i.e., twelve free STS-1 slots), but cannot provision an OC12 circuit if these twelve slots are in non-contiguous locations. Algorithms have been developed to address these optimality issues, see, e.g., S. Acharya et al., "Hitless Network Engineering of SONET Rings," Proc. IEEE Globecom, 1 Dec. 2003 and S. Acharya et al., "MobiPack: Optimal Hitless SONET Defragmentation in Near-Optimal Cost," Proc. $23^{rd}$ IEEE Infocom, 7 Mar. 2004, the discourses of which are incorporated by reference herein.

4.1.2 Status-Based Circuit Analysis

After removing invalid circuits based on semantics, the port status of end-points of a circuit is examined. The most common port statuses are in-use (i), not in-use (a) and not monitored (n). The last status means the network operator has disabled the diagnostic capabilities of a low-speed port. In many operational networks, this indicates an unused port as technicians frequently turn-off diagnostic capabilities of unused ports to suppress error messages. We use the following rules to classify circuit status. Given a circuit C with cross-connections $X_i$ ordered from east to west, the low-speed port status of the circuit end points ($X_i$ and $X_n$) is examined as follows:

1. Liveness. A live circuit has one or both end points in-use, $ES(X_1)=WS(X_n)=i$.

2. Unused. An unused circuit has both end points not in-use $ES(X_1)=WS(X_n)=a$.

3. Unknown. Otherwise, the circuit is marked as possibly unused and requires further investigation. Ports that are not monitored need to have their monitoring capabilities enabled to allow further analysis.

Figure 9:
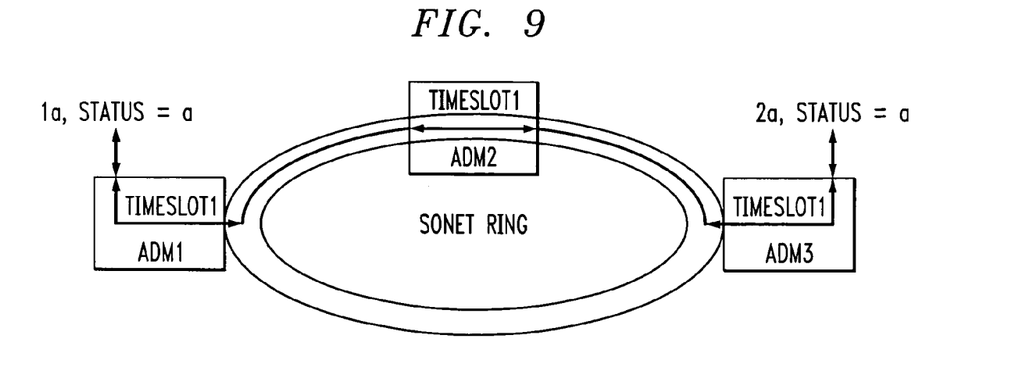
FIG. 9 is a diagram illustrating an unused circuit example according to an embodiment of the invention.

An example of a status-based validator is an unused circuit validator. FIG. 9 shows an unused circuit from ADM1 to ADM3. In this case, the low-speed ports that terminate the circuit do not carry any user traffic. We can infer the circuit as unused and free all the resources consumed by the circuit.

4.2 Inventory Analysis

The SONET/SDH field data contains detailed configuration information that can be used for inventory analysis. This includes, for example, examining each ADM to see if it has adequate or excessive sparing, and verifying its software configuration.

A logical model of an ADM can be constructed, which has n low-speed ports, m high-speed ports (see FIG. 4) and k spare ports. The high-speed ports are used to construct a ring network, and the low-speed ports contain circuit packs that multiplex incoming traffic to the high-speed port. Important traffic like emergency 911 voice circuits are typically protected via a 1×n circuit pack in the spare port. It can be deduced that an ADM has excessive or inadequate sparing from the logical model by examining the circuit pack configurations in the low-speed and spare ports.

Improper software configuration can potentially disrupt network operation and cause intermittent faults. The software configuration of each ADM can be verified to ensure that it has the proper software configuration (e.g., operating system release, patch level, time) and the configuration is consistent across a ring.

5. Sample Result and Studies

In this section, we present results from studies on two operational SONET networks. We found a significant amount of stranded resources and configuration errors in both networks. We also identify areas for optimization, and present the results from a revenue recovery study in Section 5.3.

5.1 Network A

The first study was conducted on a large carrier network in USA. We gathered field data directly from the SONET NEs for one regional network. The network consisted of 57 OC48 SONET BLSR rings spanning 3 states, and an average ring size of 3.1 ADMs. There are 1372 circuits on the OC48 rings, consuming 69 percent of the available bandwidth. The ring utilization was bimodal, with many rings heavily utilized and some rings lightly utilized. There are also 30 subtending OC12 access rings supporting 141 circuits.

Prior to the study, the operator reported significant provisioning problems. One out of three circuit provisioning attempts failed even though the DBoR indicated that the network has sufficient capacity. When we analyzed the field data we found significant stranded resources in the network:

2.1 percent dangling circuits, consuming 2.4 percent of the total bandwidth.

3.8 provisioned but unused circuits, consuming 3.2 percent of the total bandwidth.

4.4 percent provisioned and probably unused (not monitored) circuits, consuming 4.8 percent of the total bandwidth.

14.5 percent of ADMs had excess circuit packs that could be removed and deployed elsewhere.

We also found many configuration errors affecting network reliability and performance, including:

32 percent of circuits expected to have 1+1 cross-connections were incorrectly provisioned. This corresponds to 1 percent of all circuits.

12 percent of ADMs have older OS or incorrect software configuration.

13 percent of ADMs have insufficient circuit pack protection. Some of these ADMs were known to be carrying traffic for emergency services.

5.2 Network B

The second study was conducted on a metropolitan network in a large city. The network consists of 103 OC48 SONET BLSR rings and an average ring size of 3 ADMs. There are 2155 circuits consuming 75 percent of the available bandwidth. In this study, we were given partial field data that excludes equipment status and configuration information because of which we were unable to perform status, inventory and many types of semantics-based analysis. Our data cleaning was done off-line.

Given these restrictions, we still found some amount of stranded resources and configuration errors. In particular, we found 1 percent dangling circuits consuming 1.2 percent of the total bandwidth. We also detected 1.4 percent squelch circuits and 0.2 percent circuits with invalid addresses. Both are latent errors that could potentially impact failure recovery.

5.3 Revenue Recovery Study

Figure 10:
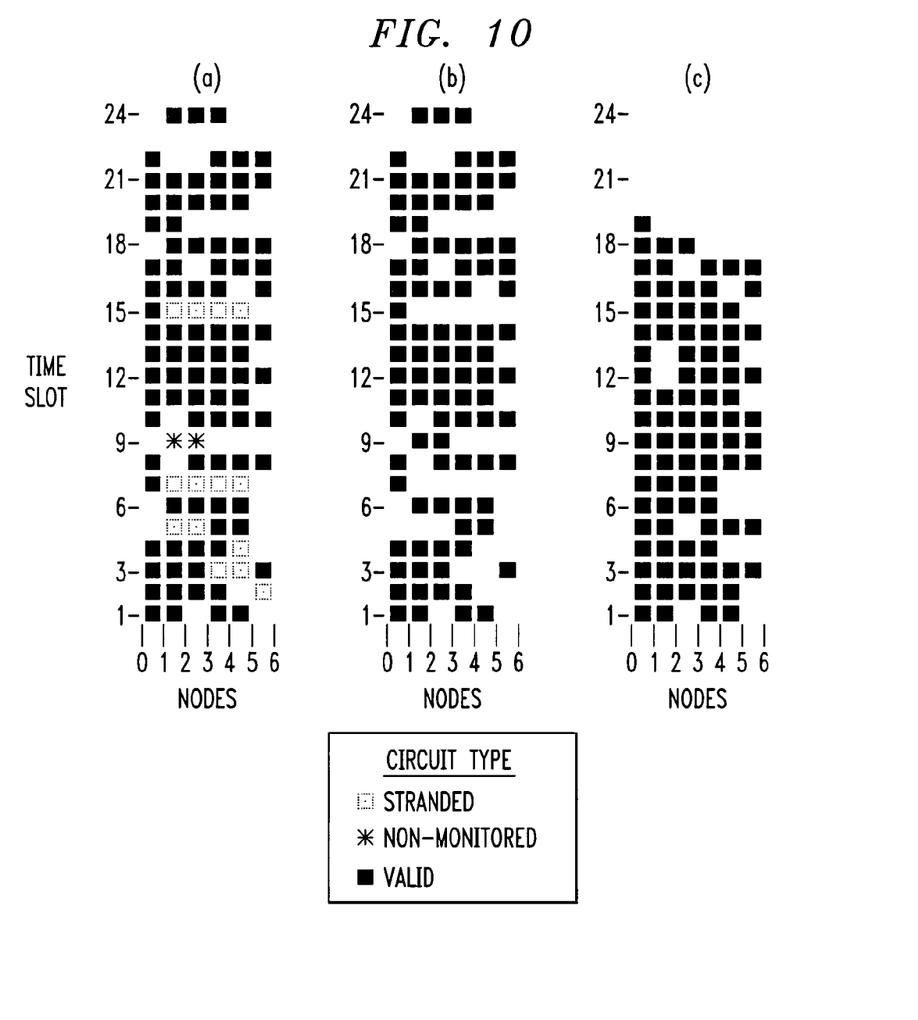
FIG. 10 is a diagram illustrating sample output of a cleanup study according to an embodiment of the invention.

We now present the result of the revenue recovery study on a sample ring (it is one of the rings from the study in Section 5.1). FIG. 10 shows the ring layout pictorially. It is a 6-node OC-48 BLSR ring with the x-axis denoting the nodes and the SONET slots on the y-axis. Only the first 24 slots (of the 48 in the ring) are shown since in BLSR, half the ring is used for protection. A darkened tab indicates that the particular slot is carrying traffic between the two nodes, or, it is empty otherwise. There were 44 circuits of STS-1 granularity on the ring.

Recall that one step of the process is to do a "cleanup" of the data that eliminates obvious syntactic errors (e.g., "Stby" instead of "Stdby"). Then, a circuit analysis is performed to classify the nature of all circuits in the ring and the tabs (see legend) indicate the classification of cross-connects after our data analysis, namely, valid, stranded, or, non-monitored (FIG. 10(a)). FIG. 10(b) shows the output of the cleanup process described above. In this case, all the stranded cross-connects were removed which accounted for 9.7 percent bandwidth for this specific ring. For a service provider, recovering 10 percent of the bandwidth is a huge operational and monetary savings. For this specific case, it was determined that the non-monitored circuits were indeed valid circuits and, thus, not deleted from the network.

For both the two trials, estimates of monetary savings from improved provisioning time and additional "freed" capacity were also recorded. For example, 2.4 percent of additional capacity available in a regional network for a large service provider translates to hundreds of thousands of dollars per year. Moreover, in many cases where the service provider plans to upgrade the network to next-generation elements, an accurate inventory of the actual traffic lowers their migration cost and enables them to reduce the size of the new network ordered.

Further savings could be had by defragmenting the bandwidth on the ring. This is shown in FIG. 10(c). Bandwidth defragmentation was mentioned in Section 4.1.1 and is further described in the above-referenced S. Acharya et al. articles. This process aims to coalesce all the standard capacity into contiguous locations. The figure shows the layout of the ring after circuits have been re-routed one-at-a-time so as to create large contiguous free spaces. For example, a new STS-3 demand, requiring three contiguous timeslots, from node 2 to 4 can now be met which would not have been possible otherwise. This new layout was achieved by re-routing 12 circuits (out of the 44 in the ring) to new routes. This example illustrates the end-to-end revenue recovery process.

6. Illustrative Hardware Implementation

Figure 11:
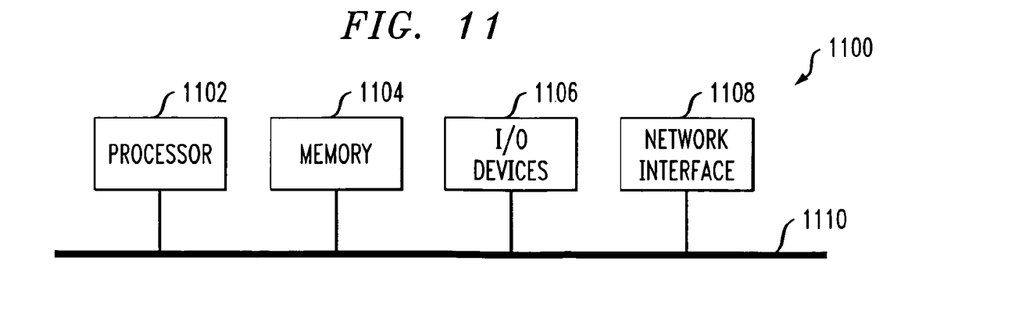
FIG. 11 is a diagram illustrating an architecture of a computer system suitable for implementing a system for identifying stranded resources and configuration errors in a data communications network according to an embodiment of the invention.

Referring now to FIG. 11, a block diagram illustrates an architecture of a computer system suitable for implementing a system for identifying stranded resources and configuration errors in a data communications network, according to an embodiment of the present invention. More particularly, it is to be appreciated that computer system 1100 in FIG. 11 may be used to implement and perform the methodologies of the invention, as illustratively described above in the context of FIGS. 1 through FIG. 10. Also, it is to be understood that one or more network elements may implement such a computing system 1100. Of course, it is to be understood that the invention is not limited to any particular computing system implementation.

Thus, computing system 1100 could be used to identify stranded resources and/or configuration errors in accordance with the methodologies of the invention described herein such that the results could then be implemented in the subject network by a service provider so as to realize revenue recovery.

In this illustrative implementation, a processor 1102 for implementing at least a portion of the methodologies of the invention is operatively coupled to a memory 1104, input/output (I/O) device(s) 1106 and a network interface 1108 via a bus 1110, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide the inputs used by a system of the invention to generate identification and revenue recovery results. Alternatively, the inputs could be read into the system from a diskette or from some other source (e.g., another computer system) connected to the computer bus 1110. Also, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 1100 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1102.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method of identifying at least one error comprising at least one resource which is at least one of misconfigured and stranded in at least a portion of a connection-oriented or circuit-switched network comprising a plurality of elements, the method comprising the steps of:
   obtaining field data directly from one or more of the elements of the network;
   examining, by a processor, at least a portion of the obtained field data to determine an existence of one or more element-level resources which are at least one of misconfigured and stranded; and
   analyzing, by said processor, at least one model synthesized from at least a portion of the obtained field data to determine an existence of one or more network-level resources which are at least one of misconfigured and stranded.

2. The method of claim 1, further comprising the step of taking at least one action to correct the at least one error.

3. The method of claim 2, wherein the at least one action taken comprises reconfiguring at least a portion of the network.

4. The method of claim 1, wherein the field data obtaining step further comprises automatically collecting field data directly from one or more elements of the network.

5. The method of claim 1, wherein the field data obtaining step further comprises manually collecting field data directly from one or more elements of the network.

6. The method of claim 1, wherein a given element-level resource comprises one of port, a timeslot and a cross-connection.

7. The method of claim 1, wherein a given network-level resource comprises one of circuit, a ring and a network element.

8. The method of claim 1, wherein the element-level resource examining step further comprises checking for one or more of a syntax error, a schema error, a semantic error, a configuration error, and a status indicative of a stranded resource.

9. The method of claim 1, wherein the network-level resource analysis step further comprises performing at least one of a circuit analysis and an inventory analysis.

10. The method of claim 9, wherein the circuit analysis further comprises verifying that a circuit in the network is correctly configured.

11. The method of claim 9, wherein the circuit analysis further comprises a semantic-based circuit analysis for determining an existence of one or more of a dangling circuit, a squelch circuit, a trunk circuit and a fragmentation.

12. The method of claim 9, wherein the circuit analysis further comprises a status-based circuit analysis for determining a port status of end-points of a circuit.

13. The method of claim 9, wherein the inventory analysis further comprises examining information relating to at least one of sparing and software configuration.

14. The method of claim 1, wherein the connection-oriented or circuit-switched network comprises at least one of a Synchronous Optical Network (SONET) and a Synchronous Digital Hierarchy (SDH) network.

15. The method of claim 1, wherein the examining and analyzing steps are performed without substantial reliance on data stored prior to the obtaining field data step.

16. The method of claim 1, wherein a given element-level resource is a resource of a given one of the elements of the network.

17. The method of claim 1, wherein the examining step for a given element-level resource is local to a given one of the elements of the network.

18. The method of claim 1, wherein each of the elements comprises a respective data multiplexer.

19. Apparatus for identifying at least one error comprising at least one resource which is at least one of misconfigured and stranded in at least a portion of a connection-oriented or circuit-switched network comprising a plurality of elements, the apparatus comprising:
   a memory; and
   at least one processor coupled to the memory and operative to: (i) obtain field data directly from one or more of the elements of the network; (ii) examine at least a portion of the obtained field data to determine an existence of one or more element-level resources which are at least one of misconfigured and stranded; and (iii) analyze at least one model synthesized from at least a portion of the obtained field data to determine an existence of one or more network-level resources which are at least one of misconfigured and stranded.

20. A non-transitory computer readable storage medium encoded with computer executable instructions to be executed by a processor to perform the steps of:
   obtaining field data directly from one or more elements of a connection-oriented or circuit-switched network;
   examining, by said processor, at least a portion of the obtained field data to determine an existence of one or more element-level resources which are at least one of misconfigured and stranded; and
   analyzing, by said processor, at least one model synthesized from at least a portion of the obtained field data to determine an existence of one or more network-level resources which are at least one of misconfigured and stranded.

* * * * *